United States Patent
Hashimoto et al.

(10) Patent No.: US 7,145,458 B2
(45) Date of Patent: Dec. 5, 2006

(54) NON-CONTACT IC TAG SYSTEM

(75) Inventors: Shigeru Hashimoto, Tokyo (JP); Tadashi Haeno, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 189 days.

(21) Appl. No.: 11/009,463

(22) Filed: Dec. 13, 2004

(65) Prior Publication Data

US 2006/0006242 A1    Jan. 12, 2006

(30) Foreign Application Priority Data

Jul. 7, 2004    (JP)    ............... 2004-201129

(51) Int. Cl.
*G08B 13/14*    (2006.01)

(52) U.S. Cl. ............... 340/572.1; 340/572.4; 340/10.1; 340/5.92; 340/505; 235/385; 235/492; 235/375

(58) Field of Classification Search ............ 340/572.1, 340/572.4, 10.1, 5.92, 505; 235/385, 492, 235/375
See application file for complete search history.

(56) References Cited

U.S. PATENT DOCUMENTS

| 4,562,535 A | 12/1985 | Vincent et al. |
| 5,565,858 A | 10/1996 | Guthrie |
| 6,010,066 A | 1/2000 | Itou et al. |
| 6,532,158 B1 | 3/2003 | Buttet |
| 6,927,688 B1 * | 8/2005 | Tice .................. 340/539.26 |
| 6,960,999 B1 * | 11/2005 | Haimovitch et al. ..... 340/572.1 |

FOREIGN PATENT DOCUMENTS

| DE | 102 27 558 | 1/2004 |
| EP | 0 845 837 | 11/1997 |
| EP | 0 831 413 | 3/1998 |
| EP | 1 079 324 | 2/2001 |
| JP | 2001-307055 | 11/2001 |
| JP | 2002-373058 | 12/2002 |
| JP | 2003-242469 | 8/2003 |
| JP | 2004-133596 | 4/2004 |

OTHER PUBLICATIONS

EP Search Report for corresponding application EP 04257579.5-2210 dated Oct. 26, 2005.

* cited by examiner

*Primary Examiner*—Tai Nguyen
(74) *Attorney, Agent, or Firm*—Staas & Halsey LLP

(57) ABSTRACT

A non-contact IC tag system includes a plurality of non-contact IC tags, each of which includes identification information and a memory for storing a predetermined amount of data; and a reader/writer that sends an operation command via radio to each of the non-contact IC tags. The non-contact IC tags include a plurality of slave IC tags and a master IC tag. The master IC tag holds memory configuration information that is used when building a memory space with a memory area of the memory of each of the slave IC tags and a memory area of the memory of the master IC tag.

14 Claims, 7 Drawing Sheets

FIG.7

MEMORY CONFIGURATION
INFORMATION TABLE
400c

| TAG ID | MEMORY STARTING ADDRESS | MEMORY BYTE COUNT |
|---|---|---|
| UID OF TAG 10 | 0x0080 | 0x0080 |
| UID OF TAG 21 | 0x0100 | 0x0100 |
| UID OF TAG 22 | 0x0200 | 0x0100 |
| UID OF TAG 23 | 0x0300 | 0x0100 |

NON-CONTACT IC TAG SYSTEM

BACKGROUND OF THE INVENTION

1) Field of the Invention

The present invention relates to a non-contact IC tag system including a plurality of non-contact IC tags that has identification information for identifying the non-contact IC tags, and includes a storage unit for storing a predetermined data amount, respectively, and a reader/writer that sends operation commands via radio to each of the non-contact IC tags, and more particularly, to a non-contact IC tag system that can handle large data efficiently with a non-contact IC tag that is mass-produced with a low cost and a small memory capacity.

2) Description of the Related Art

Conventionally, a technology in which barcodes are given to various products in a shop and a cashier reads the barcodes using a barcode reader is known. Recently, a non-contact Radio Frequency Identification (RFID) tag (hereinafter, "IC tag") is often used instead of the barcode. With the IC tag, information can be updated and added, and plural individuals can be recognized collectively. Thus, the IC tag attracts attentions as an individual recognition technology in the next generation substituting for the barcode.

Such an IC tag includes a silicon chip that contains a memory and an antenna that can transmit data by radio. Since various data can be stored on this memory, the IC tag is used in various fields as a kind of an information storage.

For example, Japanese Patent Application Laid-Open No. 2001-307055 discloses an IC tag that is constituted to store secret information for each stage in a life cycle from production to disposal. In addition, Japanese Patent Application Laid-Open No. 2004-133596 discloses a monitoring system that is constituted to store measurement information obtained by various sensors disposed in a plant and transmit this measurement information to a plant failure diagnosis apparatus.

In the conventional IC tag, necessary data is stored in a memory in an IC chip by a necessary amount while changing a memory capacity in the IC tag as occasion arises according to an application (disposed place) of the IC tag. In other words, since each IC tag can function within a range of the memory capacity implemented in the IC tag, it is necessary to implement a necessary and sufficient memory capacity in each IC tag.

However, such an IC tag is not essentially of a nature to change a memory capacity appropriately according an application thereof and does not have significance unless IC tags of an identical standard is produced in a large quantity to reduce overall cost. This is because, if cost for introducing the IC tag is too large, it is less expensive to use a barcode. In other words, although it is technically possible to mount a memory with a large capacity on an IC tag used for a special application, since production cost for such an IC tag increases naturally, it is inefficient to change a memory capacity of the IC tag according a system.

On the other hand, since it is expected that such an IC tag will be used more widely in various fields in future, needs for an IC tag handling a lager amount of data are considered to increase. For example, when it is desired to maintain data of temperature and humidity history management, positional information, and the like of wine, meat, and the like on an IC tag for a long period of one week, the IC tag is required to be capable of handling a large amount of data.

Consequently, an extremely important problem is how to handle large data efficiently while using an IC tag that is produced in a large quantity and inexpensive and has a small memory capacity. In particular, such a problem is conspicuous when an IC tag is used in a monitoring system.

SUMMARY OF THE INVENTION

It is an object of the present invention to solve at least the above problems in the conventional technology.

A non-contact IC tag system according to one aspect of the present invention includes a plurality of non-contact IC tags, each of which includes identification information and a memory for storing a predetermined amount of data; and a reader/writer that sends an operation command via radio to each of the non-contact IC tags. The non-contact IC tags include a plurality of slave IC tags and a master IC tag. The master IC tag holds memory configuration information that is used when building a memory space with a memory area of the memory of each of the slave IC tags and a memory area of the memory of the master IC tag.

A non-contact IC tag system according to another aspect of the present invention includes a plurality of non-contact IC tags, each of which includes identification information and a memory for storing a predetermined amount of data; and a reader/writer that sends an operation command via radio to each of the non-contact IC tags. The non-contact IC tags include a plurality of slave IC tags and a master IC tag. The master IC tag holds memory configuration information of a slave IC tag linked to a memory area of the master IC tag. Each of the slave IC tags holds memory configuration information of a slave IC tag linked to a memory area of the corresponding slave IC tag.

A non-contact IC tag system according to still another aspect of the present invention includes a plurality of non-contact IC tags, each of which includes identification information and a memory for storing a predetermined amount of data; a reader/writer that sends an operation command via radio to each of the non-contact IC tags; and a host apparatus connected to the reader/writer. Either of the reader/writer and the host apparatus includes a memory-configuration-information storing unit that stores memory configuration information for integrating memory areas of the memories of the non-contact IC tags to build a memory space; and a memory managing unit that manages the non-contact IC tags as one non-contact IC tag based on the memory configuration information stored in the memory-configuration-information storing unit.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 7 is a diagram of an example of a memory configuration information table shown in FIG. 6.

DETAILED DESCRIPTION

Exemplary embodiments of a non-contact IC tag system according to the present invention will be explained in detail with reference to the accompanying drawings.

Figure 1:
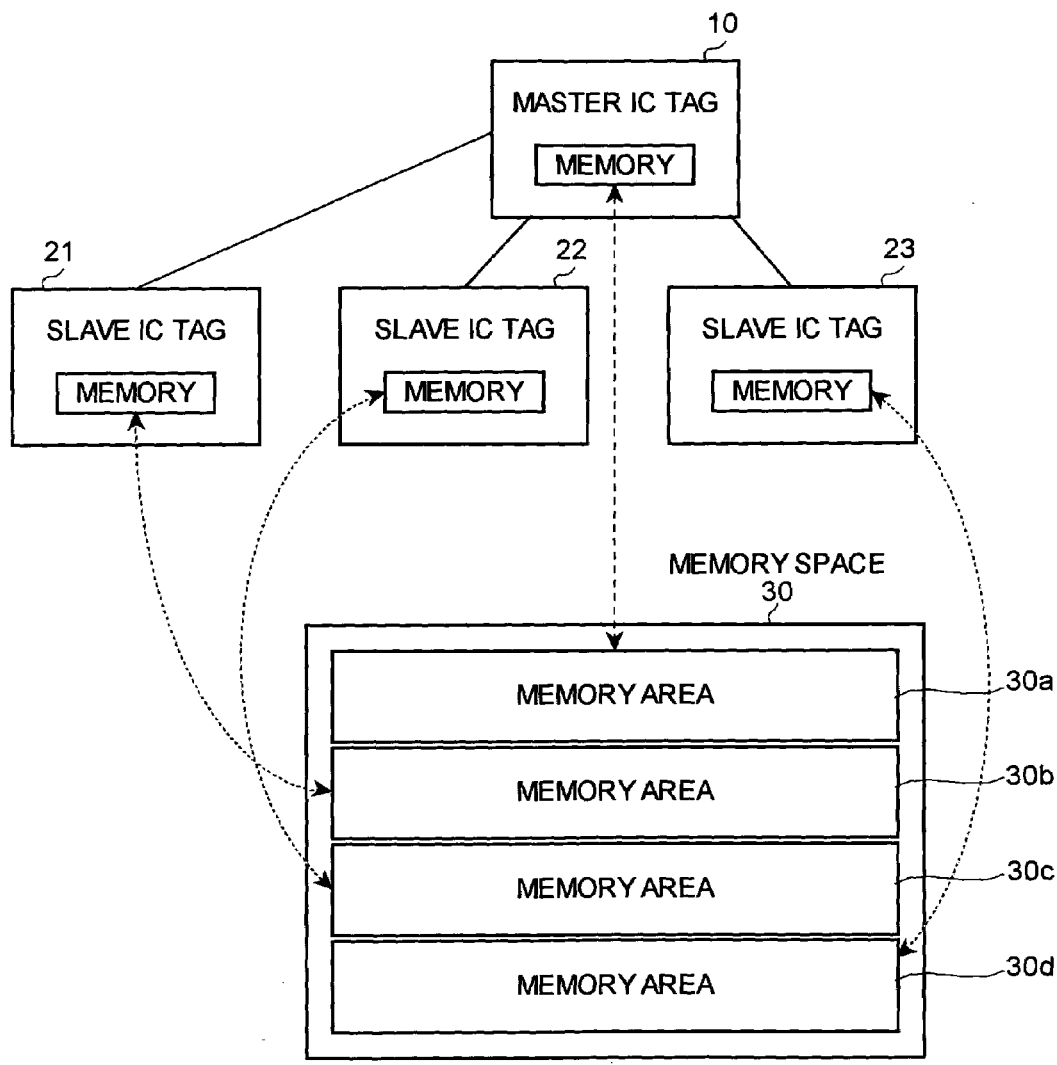
FIG. 1 is an explanatory diagram for explaining a concept of an IC tag system according to an embodiment of the present invention.

FIG. 1 is an explanatory diagram for explaining the concept of the IC tag system according to an embodiment of the present invention. The IC tag system according to the embodiment is characterized in that the IC tag system makes it possible to handle large data on a wide memory space by uniting plural IC tags rather than handling respective IC tags as independent information storing devices.

More specifically, as shown in FIG. 1, a large memory space 30 is formed by dividing plural IC tags to be handling objects into a master IC tag 10 and slave IC tags 21 to 23 and uniting memory areas held by the respective IC tags. In the figure, a memory area 30a corresponds to a memory of the master IC tag 10, a memory area 30b corresponds to a memory of the slave IC tag 21, a memory area 30c corresponds to a memory of the slave IC tag 22, and a memory area 30d corresponds to a memory of the slave IC tag 23.

As described above, a reason for handling the plural IC tags collectively is to make it possible to handle large data efficiently using an IC tag that is produced in a large quantity and inexpensive and has a small memory capacity. Although it is expected that needs for an IC tag, which can handle a lager amount of data, will increase in future, it is inefficient to change a memory capacity of the IC tag for each system. Therefore, in the embodiment, the plural tags are handled collectively.

Here, to realize the constitution mentioned above, it is necessary to hold a correspondence relation between memories of respective IC tags and memory areas on a memory space somewhere. Therefore, in the embodiment, a memory configuration of the memory of the master IC tag 10 and the memories of the respective slave IC tags 21 to 23 is managed in the master IC tag 10. Identification information, memory starting addresses, and memory byte counts of the respective slave IC tags 21 to 23 are stored on the memory (nonvolatile memory) of the master IC tag 10, although a detailed explanation thereof will be described later.

Figure 2:
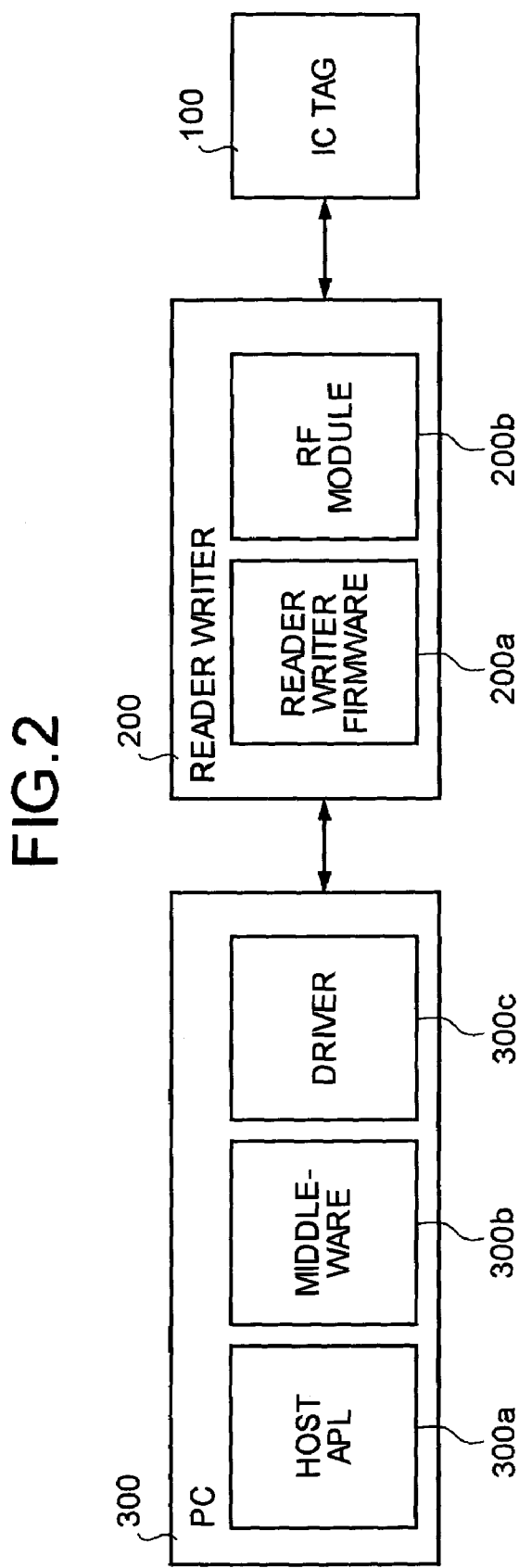
FIG. 2 is an explanatory diagram for explaining the concept of the IC tag system according to the embodiment.

FIG. 2 is a block diagram of the system structure of the IC tag system according to the embodiment. As shown in the figure, this IC tag system includes an integrated circuit (IC) tag 100, a reader/writer 200, and a personal computer (PC) 300. The IC tag 100 and the reader/writer 200 perform data communication each other by radio. In addition, the reader/writer 200 and the PC 300 are connected to each other by a universal serial bus (USB), a local area network (LAN), or the like and perform data communication each other.

The PC 300 generates a command or the like for the IC tag 100 and transmits the generated command or the like to the IC tag 100 using the reader/writer 200. The PC 300 receives data recorded in the IC tag 100 using the reader/writer 200. In addition, the PC 300 includes a host application (APL) 300a, a middleware 300b, and a driver 300c.

The host APL 300a acquires information like an identification (ID) and a password of the IC tag 100 from a not-shown server, input device, or the like and passes the acquired ID and password and the command for the IC tag 100 to the middleware 300b. The middleware 300b performs processing, which is substantially the same as processing performed by an operating system (OS), and delivers data between the host APL 300a and the driver 300c.

The driver 300c performs interface control or the like with the reader/writer 200. In addition, the driver 300c transmits data passed from the host APL 300a to the reader/writer 200 and passes data received from the reader/writer 200 to the host APL 300a via the middleware 300b.

The reader/writer 200 interprets a command included in data received from the PC 300 and writes the data in the IC tag 100. In addition, the reader/writer 200 reads out data included in the IC tag 100 and transmits the read-out data to the PC 300. Note that the reader/writer 200 includes a reader/writer firmware 200a and an RF module 200b.

The reader/writer firmware 200a is a processing unit that interprets the interface control with the PC 300 and a command transmitted from the PC 300. The reader/writer firmware 200a has a function of selecting the master IC tag 10 out of the plural IC tags 100. More specifically, the reader/writer firmware 200a designates a specific address memory using a group select command, which is defined in the type B specifications of the ISO18000, to thereby select the master IC tag 10 out of the plural IC tags 100. The RF module 200b is a processing unit that writes data in and reads out data from the IC tag 100.

The IC tag 100 is a tag that is formed of an IC chip, which includes a central processing unit (CPU), a random access memory (RAM), a read-only memory (ROM), a nonvolatile memory, and the like, and a coil-like antenna connected to the IC chip and exchanges data with the reader/writer 200 by radio. The master IC tag 10 and the slave IC tags 21 to 23 are included in the IC tag 100. Here, the master IC tag 10 is a tag in which the IC tag itself and the respective slave IC tags 21 to 23 are united in terms of memory management. The master IC tag 10 stores identification information, memory starting addresses, and memory byte counts of the respective IC tags as memory configuration information. The respective slave IC tags 21 to 23 are a kind of storage devices that are managed in a united form by the maser IC tag 10 in terms of memory management. Note that, since such a master IC tag 10 has an independent storage area, the master IC tag 10 also functions as a storage device.

Figure 3:
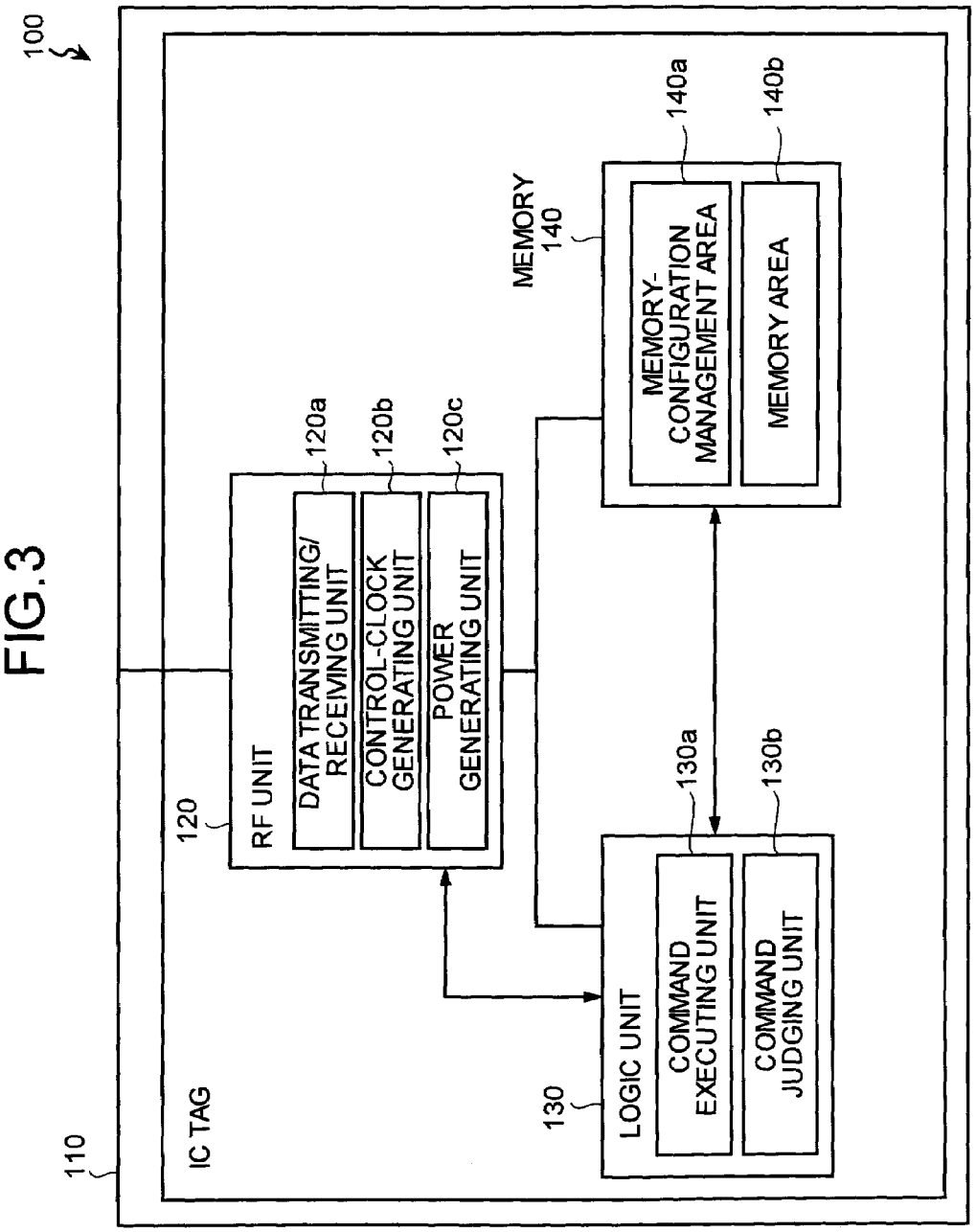
FIG. 3 is a functional block diagram of a structure of an IC tag shown in FIG. 2.

FIG. 3 is a functional block diagram of the structure of the IC tag 100 shown in FIG. 2. As shown in the figure, this IC tag 100 includes an antenna 110, an RF unit 120, a logic unit 130, and a memory 140.

The RF unit 120 is a processing unit that performs data communication or the like with the reader/writer 200 using the antenna 110. The RF unit 120 includes a data transmission and reception section 120a, a control clock generating section 120b, and a power supply generating section 120c.

The data transmission and reception section 120a receives data from the reader/writer 200 using the antenna 110 and passes the received data to the logic unit 130. In addition, the data transmission and reception section 120a transmits data received from the logic unit 130 to the reader/writer 200 using the antenna 110.

The control clock generating section 120b generates a control clock and supplies the generated control clock to the logic unit 130. The power supply generating section 120c converts an electromagnetic field, which is transmitted from the reader/writer 200 using the antenna 110, into electric power and supplies the converted electric power to the logic unit 130 and the memory 140.

The logic unit 130 is a processing unit that applies predetermined processing to the memory 140 according to a command included in data passed from the RF unit 120. The logic unit 130 includes a command executing section 130a and a command judging section 130b.

The command executing section 130a performs processing based on the command included in the data passed from the RF unit 120. Note that, as the command included in the data passed from the RF unit 120, there are a write command, a read command, a group select command, and the like.

The memory 140 is a nonvolatile memory like a flash memory and includes a memory configuration management area 140a and a memory area 140b. Although the memory configuration management area 140a is used when such an IC tag 100 functions as the master IC tag 10, the memory 140 is entirely used as the memory area 140b without securing the memory configuration management area 140a when the IC tag 100 functions as the slave IC tags 21 to 23.

The memory configuration management area 140a is an area that stores memory configuration information that is required in forming a united memory space using the master IC tag 10 (IC tag itself) and the slave IC tags 21 to 23. More specifically, the memory configuration management area 140a stores identification information, memory starting addresses, and memory byte counts of the respective IC tags 100. The memory area 140b is a storage area that stores actual data.

Figure 4:
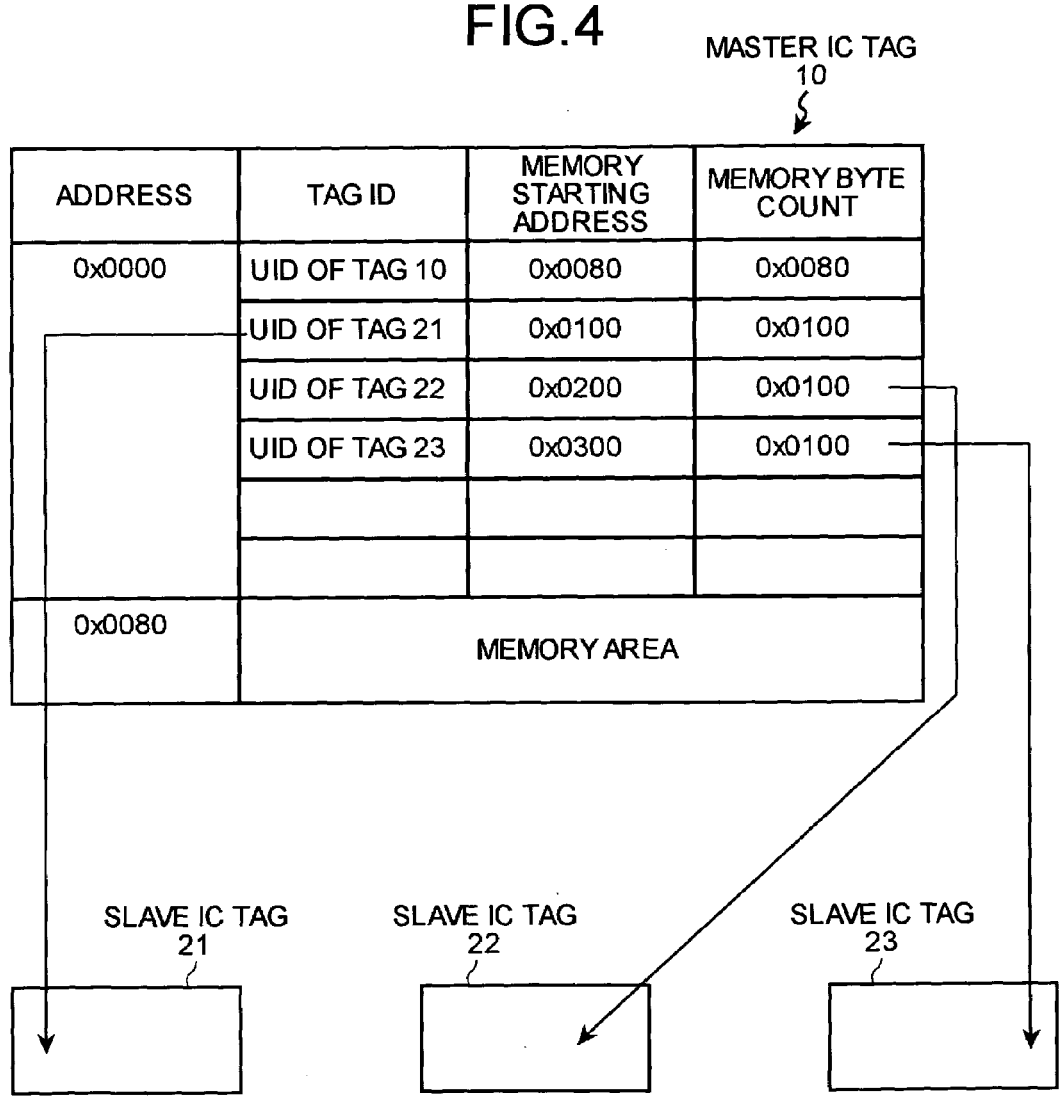
FIG. 4 is a diagram of an example of memory configuration information that is stored in a memory configuration management area shown in FIG. 3.

FIG. 4 is a diagram of an example of memory configuration information stored in the memory configuration management area 140a shown in FIG. 3. Here, an area of addresses 0×0000 to 0×00FF (it is assumed that "0×" indicates hexadecimal representation in the following description) of the master IC tag 10 is the memory configuration management area 140a. Memory related information of the master IC tag 10, which is the IC tag itself, the slave IC tag 21, the slave IC tag 22, and the slave IC tag 23 is stored in this area.

More specifically, identification information (hereinafter, "UID"), a memory staring address "0×0080", and a memory byte count "0×0080" of the master IC tag 10, UID, a memory starting address "0×0100", and a memory byte count "0×0100" of the slave IC tag 21, UID, a memory starting address "0×0200", and a memory byte count "0×0100" of the slave IC tag 22, UID, a memory starting address "0×0300", and a memory byte count "0×0100" of the slave IC tag 23 are stored.

Consequently, if the reader/writer 200 acquires the memory configuration information in the memory configuration management area 140a of such a master IC tag 10, the three slave IC tags 21 to 23 are dependent on the master IC tag 10, and UIDs, starting addresses, memory byte counts of the respective slave IC tags 21 to 23 can be grasped.

It is also possible to improve reliability of data by storing identical data in areas, which correspond to plural tags on a memory space formed in this way, respectively, redundantly. In this case, when data cannot be read out from a predetermined IC tag 100 storing the data, the reader/writer 200 only has to perform control to read out data from the other IC tags 100 including the data. In addition, it is also possible to store such redundantly stored information in the master IC tag 10 and the slave IC tag 21. In such a case, when the data cannot be read out from the master IC tag 10, the reader/writer 200 only has to perform control to read out the data from the slave IC tag 21 including the data. Since it is sufficient to access the master IC tag 10 preferentially except in an abnormal case, access efficiency can be improved. Note that it is possible to store the redundantly stored information in the IC tag 100 efficiently by preparing a dedicated command for selecting an IC tag in which redundantly stored information of memory data is stored. As such a dedicated command, it is also possible to use a group select command defined in the type B specifications of the ISO18000.

As described above, in the embodiment, plural IC tags are divided into the master IC tag 10 and the slave IC tags 21 to 23, memory configuration information of the master IC tag 10 itself and the respective slave IC tags 21 to 23 (identification information, memory starting addresses, and memory byte counts of the respective IC tags) are stored in the memory configuration management area 140a of the memory 140 of the master IC tag 10, and the reader/writer 200 specifies the master IC tag 10 to handle these IC tags in a united form. Thus, it is possible to handle large data efficiently while using an IC tag that is produced in a large quantity and inexpensive and has a small memory capacity.

Incidentally, the case in which memory configuration information of the respective slave IC tags 21 to 23 is managed collectively on the master IC tag 10 side is described in the above series of explanation. However, it is also possible to realize the management with a chain system of a linked list type.

Figure 5:
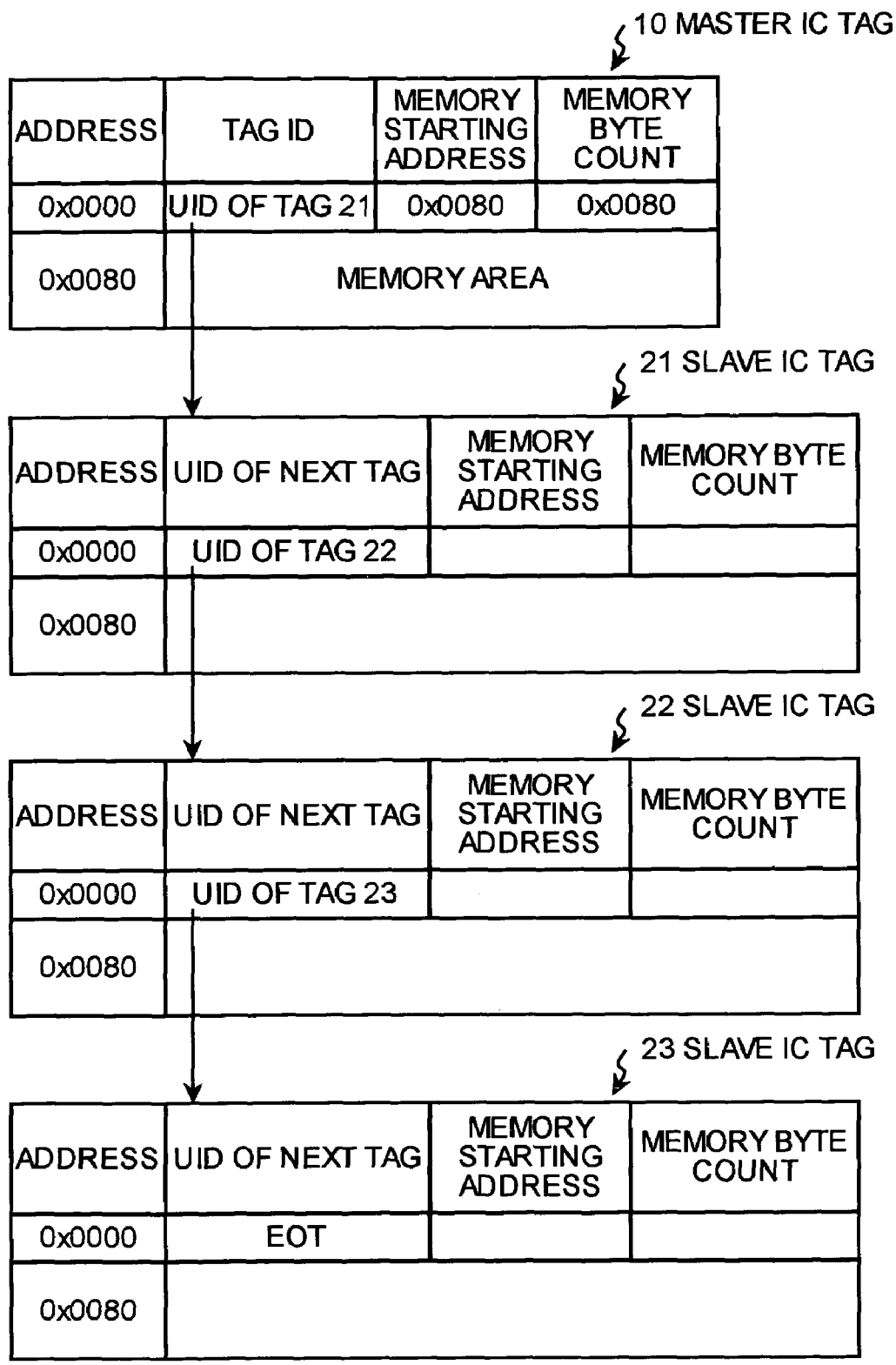
FIG. 5 is an explanatory diagram of a case in which memory configuration information is managed in a chain system of a linked list type.

FIG. 5 is an explanatory diagram of a case in which memory configuration information is managed by the chain system of the linked list type. As shown in the figure, here, the master IC tag 10 and the slave IC tags 21 to 23 hold the memory configuration information in a distributed manner. More specifically, the master IC tag 10 holds only memory configuration information (a tag ID, a memory starting address, and a memory byte count) of the slave IC tag 21 to which a memory area of the master IC tag 10 is linked, the slave IC tag 21 holds memory configuration information (a tag ID, a memory starting address, and a memory byte count) of the slave IC tag 22 to which a memory area of the slave IC tag 21 is linked, and the slave IC tag 22 holds memory configuration information (a tag ID, a memory starting address, and a memory byte count) of the slave IC tag 23 to which a memory area of the slave IC tag 22 is linked. Note that, since the slave IC tag 23 is a tag at a link end, "End Of Tag (EOT)" is stored in a column of UID of next tag in memory configuration information thereof.

In this way, the memory configuration management areas 140a are provided in all the IC tags 100, and memory configuration information of the IC tag 100, to which memory area of one IC tag 100 is linked, is stored in the memory configuration management area 140a of the one IC tag 100. Consequently, it is possible to handle large data efficiently while using an IC tag that is produced in a large quantity and inexpensive and has a small memory capacity as in the embodiment described above.

Figure 6:
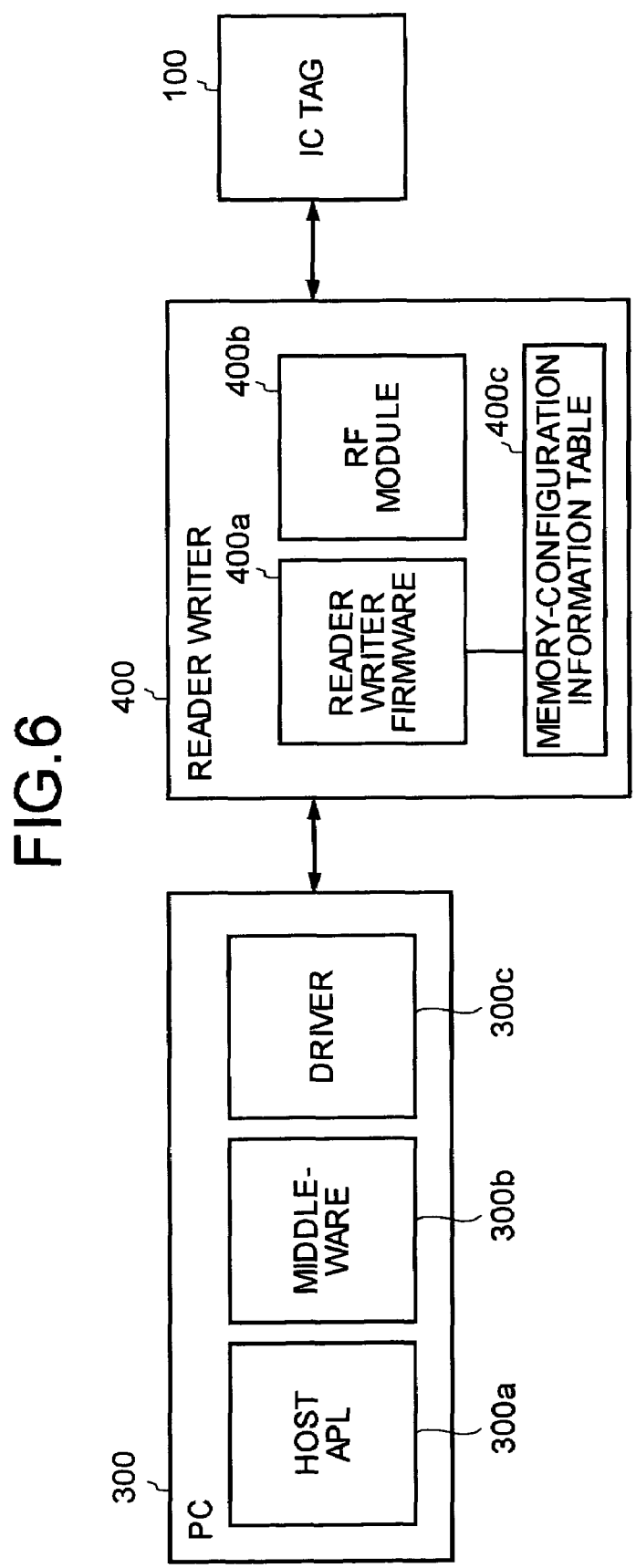
FIG. 6 is a diagram of a system structure in a case in which memory configuration information is provided in a reader/writer.

In addition, although the case in which memory configuration information is provided on the IC tag 100 side is explained in the embodiment, it is also possible to provide memory configuration information on the reader/writer 400 side or the PC 300 side. FIG. 6 is a diagram of a system configuration in a case in which memory configuration information is provided in the reader/writer 400. FIG. 7 is a diagram of an example of a memory configuration information table 400c shown in FIG. 6.

As shown in FIG. 6, in such a case, the memory configuration information table 400c shown in FIG. 7 is given to a reader/writer firmware 400a of the reader/writer 400. This reader/writer firmware 400a only has to refer to the memory configuration information table 400c when the reader/writer firmware 400a reads out data from and writes data in an IC tag. In such a case, since it is possible to handle all the IC tags 100 as storage devices of the same level, efficiency of processing can be realized. Note that the memory configuration information table 400c shown in FIG. 7 is the same as the memory configuration information held by the master IC tag 10 shown in FIG. 4.

Note that, although the case in which the present invention is applied to an IC tag is described in the above series of explanation, substantially the same effect is realized when a non-contact type IC card is used. In this sense, the IC tag includes a concept of an IC card.

According to the present invention, the non-contact IC tags are formed of the plural slave IC tags and the master IC tag, and the master IC tag is constituted to hold memory configuration information that is used when one memory space is formed of the storage areas of the storage units of the respective slave IC tags and the storage area of the storage unit of the master IC tag itself. Thus, it is possible to handle large data efficiently while using a non-contact IC tag that is produced in a large quantity and inexpensive and has a small memory capacity.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A non-contact IC tag system comprising:
a plurality of non-contact IC tags, each of which includes identification information and a memory for storing a predetermined amount of data; and
a reader/writer that sends an operation command via radio to each of the non-contact IC tags, wherein
the non-contact IC tags include a plurality of slave IC tags and a master IC tag, and
the master IC tag holds memory configuration information that is used when building a memory space with a memory area of the memory of each of the slave IC tags and a memory area of the memory of the master IC tag wherein the reader/writer includes
a memory control unit that stores identical data redundantly in at least two of the non-contact IC tags; and
a readout control unit that, when data cannot be read out from a predetermined non-contact IC tag in which the data is stored by the memory control unit, controls to read out the data from other non-contact IC tag in which the data is stored redundantly.

2. The non-contact IC tag system according to claim 1, wherein
each of the non-contact IC tags includes an IC chip on which a rewritable nonvolatile memory is mounted,
the master IC tag includes a memory area for the memory configuration information and a data memory area on the nonvolatile memory, and
each of the slave IC tags includes a data memory area on the nonvolatile memory.

3. The non-contact IC tag system according to claim 1, wherein the memory configuration information includes identification information, a memory starting address, and a memory byte count of each of the slave IC tags.

4. The non-contact IC tag system according to claim 1, wherein the reader/writer includes a master-IC-tag selecting unit that selects the master IC tag from among the non-contact IC tags.

5. The non-contact IC tag system according to claim 4, wherein the master IC tag selecting unit selects the master IC tag by specifying a specific address memory using a group select command defined in type B specifications of ISO18000.

6. The non-contact IC tag system according to claim 1, wherein
the memory control unit stores the identical data in the master IC tag and at least one of the slave IC tags redundantly, and
when the data cannot be read out from the master IC tag, the readout control unit controls to read out the data from the slave IC tag in which the data is stored redundantly.

7. A non-contact IC tag system comprising:
a plurality of non-contact IC tags, each of which includes identification information and a memory for storing a predetermined amount of data; and
a reader/writer that sends an operation command via radio to each of the non-contact IC tags, wherein
the non-contact IC tags include a plurality of slave IC tags and a master IC tag,
the master IC tag holds memory configuration information of a slave IC tag linked to a memory area of the master IC tag, and
each of the slave IC tags holds memory configuration information of a slave IC tag linked to a memory area of the corresponding slave IC tag wherein the reader/writer includes
a memory control unit that stores identical data redundantly in at least two of the non-contact IC tags; and
a readout control unit that, when data cannot be read out from a predetermined non-contact IC tag in which the data is stored by the memory control unit, controls to read out the data from other non-contact IC tag in which the data is stored redundantly.

8. The non-contact IC tag system according to claim 7, wherein each of the non-contact IC tags includes an IC chip on which a rewritable nonvolatile memory is mounted, with a memory area for the memory configuration information and a data memory area on the nonvolatile memory.

9. The non-contact IC tag system according to claim 7, wherein the memory configuration information includes identification information, a memory starting address, and a memory byte count of the slave IC tag linked.

10. The non-contact IC tag system according to claim 7, wherein the reader/writer includes a master-IC-tag selecting unit that selects the master IC tag from among the non-contact IC tags.

11. The non-contact IC tag system according to claim 10, wherein the master IC tag selecting unit selects the master IC tag by specifying a specific address memory using a group select command defined in type B specifications of ISO18000.

12. The non-contact IC tag system according to claim 7, wherein
the memory control unit stores the identical data in the master IC tag and at least one of the slave IC tags redundantly, and
when the data cannot be read out from the master IC tag, the readout control unit controls to read out the data from the slave IC tag in which the data is stored redundantly.

13. A non-contact IC tag system comprising:
a plurality of non-contact IC tags, each of which includes identification information and a memory for storing a predetermined amount of data;
a reader/writer that sends an operation command via radio to each of the non-contact IC tags; and
a host apparatus connected to the reader/writer, wherein either of the reader/writer and the host apparatus includes a memory-configuration-information storing unit that stores memory configuration information for integrating memory areas of the memories of the non-contact IC tags to build a memory space; and a memory managing unit that manages the non-contact IC tags as one non-contact IC tag based on the memory configuration information stored in the memory-configuration-information storing unit.

14. The non-contact IC tag system according to claim 13, wherein the memory-configuration-information storing unit stores identification information, a memory starting address, and a memory byte count of each of the non-contact IC tags as the memory configuration information.

* * * * *